March 25, 1969 P. J. PENA 3,435,450
PIEZOELECTRIC SIGNALING DEVICE
Filed Dec. 6, 1965
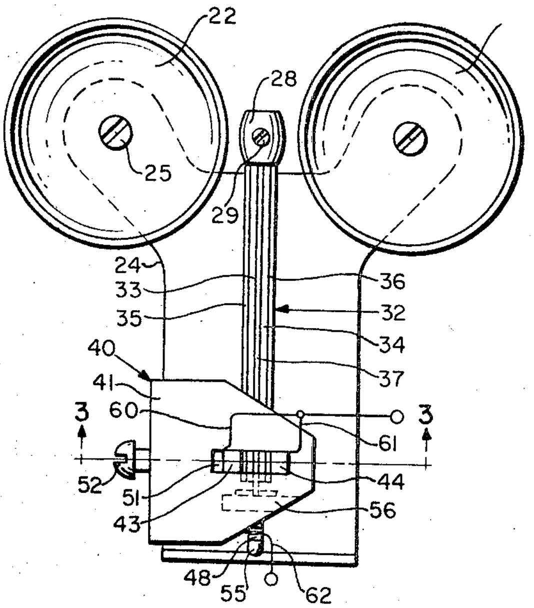
FIG. I
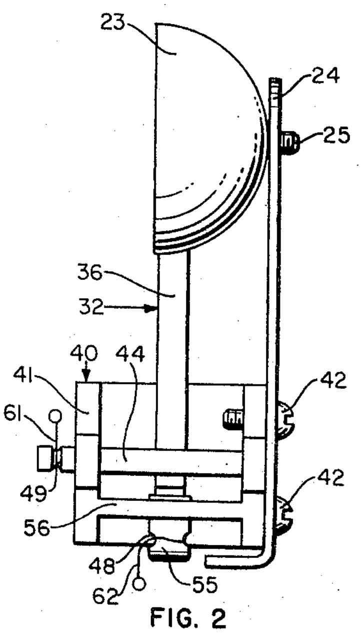
FIG. 2
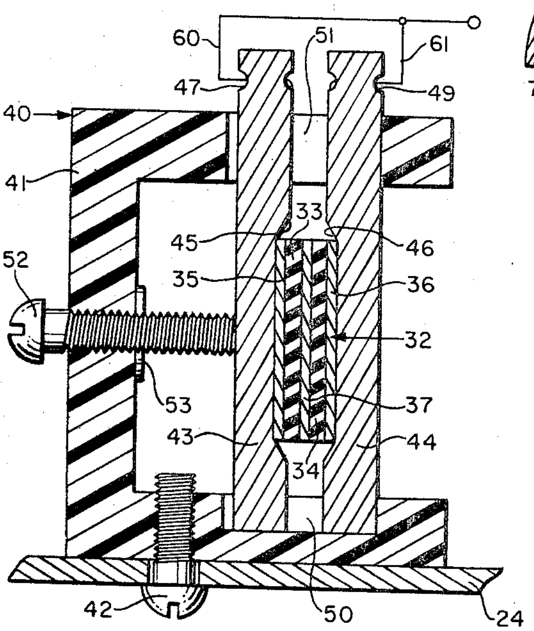
FIG. 3
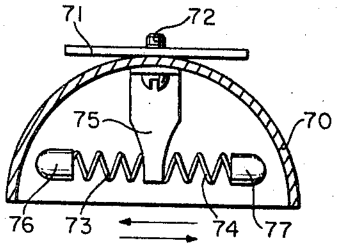
FIG. 4
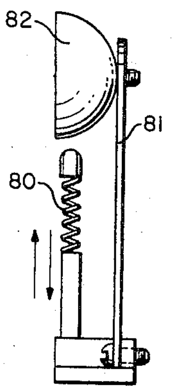
FIG. 5
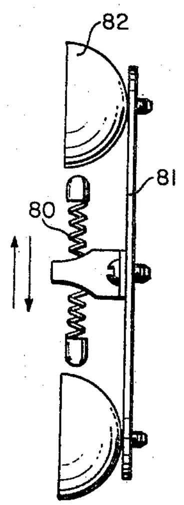
FIG. 6
INVENTOR.
PASCUAL J. PENA
BY C. A. Gulbrandsen
ATTY.

3,435,450
PIEZOELECTRIC SIGNALING DEVICE
Pascual J. Peña, Chicago, Ill., assignor to Automatic Electric Laboratories, Inc., Northlake, Ill., a corporation of Delaware
Filed Dec. 6, 1965, Ser. No. 511,958
Int. Cl. G08b 3/10; G10k 3/00
U.S. Cl. 340—392 2 Claims

ABSTRACT OF THE DISCLOSURE

A gong-type telephone ringer employs a piezoelectric element which is clamped at one end and carries a clapper at the other end for actuating the gong. Upon energization by an A.C. voltage, the element vibrates and the clapper strikes the gong. The piezoelectric element, which may be mounted within the gong, is a coil-shaped ceramic strip.

This invention relates to ringers for telephone subsets and in particular to ringers employing a piezoelectric transducer.

In U.S. Patent 3,218,636 issued to J. M. Bernstein and N. S. Suloway on Nov. 16, 1965, there has been described a piezoelectric signaling device for use in telephone signaling systems.

This patent shows an arrangement for a telephone ringer that is simpler in construction and requires fewer parts than electrodynamic ringers. A ring shaped piezoelectric element is mounted on a base in close proximity to a pair of gongs and, upon excitation, the piezoelectric element vibrates and strikes the gongs.

Although this arrangement has been found to work satisfactorily, the piezoelectric element must be clamped at or very close to points which correspond to nodes if displacement sufficient to actuate the gongs is to be obtained. Consequently, in this arrangement the clamping of the element is critical.

It is therefore an object of this invention to provide a new and improved telephone ringer.

Another object of this invention is to provide telephone ringers having a piezoelectric clapper element that does not require critical mounting.

Another object of this invention is to provide a telephone ringer having an improved sound output level.

The ringer proposed uses an elongated piezoelectric element which is operable in flexural mode. The element is clamped at one end while the other end, which is located near a pair of gongs, preferably carries a clapper. The element is excited with an A.C. electric field applied to the clamped end. Upon excitation, the free end moves the clapper which in turn strikes the gongs.

These and other objects and features will become more apparent from the subsequent detailed description which makes reference to the following drawings:

FIG. 1 is a plan view of a preferred embodiment of the invention.

FIG. 2 is an elevation of FIG. 1.

FIG. 3 is an enlarged view of the piezoelectric transducer assembly showing the arrangement for mounting the assembly to the base plate.

FIGS. 4, 5 and 6 show other embodiments of the invention.

Referring to FIG. 1, there is shown a telephone ringer having two gongs 22 and 23 mounted on a base plate 24 by means of screws 25. The piezoelectric element 32 is mounted to the base plate by means of a clamp assembly 40 and carries a clapper 28 on its free end.

The element 32, shown in FIG. 3, consists of a pair of elongated ceramic strips 33 and 34 which have been bonded to a thin electrode 37 and which have been polarized in such a way that the element will flex upon application of a voltage. The strips, which are formed of a material such as lead zirconate-titanate, are rectangular in cross-section and each strip is approximately 2 inches long and has a cross-sectional area of approximately 1/8 square inch. To energize the element, a signal source is connected between the center electrode 37 and the outer surfaces of each strip. The surfaces have been provided with a coating 35 and 36 of conductive material such as silver, so that the electric field generated by the signal applied, will be distributed uniformly around the element.

The clamp assembly 40 which holds the element consists of a mounting block 41, clamping bars 43 and 44, and a terminal clip 55.

The mounting block is preferably molded from an insulating material and is attached to the base plate 24 by means of screws 42 which in turn are received by tapped holes in the block. The block also is provided with a groove 50 and a slot 51 which receive the ends of the clamping bars.

The clamping bars are formed of a rigid conducting material such as copper or steel and are rectangular in shape. One end of each bar is located in the groove 50 while the other end extends through slot 51 in the top of the block. The upper ends of the bars have been formed as terminal posts 47 and 49 and receive signal leads 60 and 61. Each of the clamping bars has an indentation, 45 and 46 formed on the surface adjacent to the element 32. These indentations both support and position the element when it is clamped.

The terminal clip 55 is carried by a rigid strut 56 shown in FIG. 2, which is an integral part of the mounting block. The clip, which is formed of resilient conducting material, is attached to the center electrode of the element and serves as electrical terminal means. The clip has a terminal post 48 formed on one end to which is attached a signal lead 62.

The element is inserted between the clamping bars adjacent the indentations 45 and 46 formed in the bars. It should be noted that the clamping of the element is not critical when the type of element described above is used, although more deflection is obtainable when the element is clamped near one end and with the end of the element extending somewhat beyond the clamp.

The bars are moved into clamping engagement with the element by means of screw 52 extending through a tapped hole in the mounting block and having one end abutting a surface of bar 43. As can be seen in FIG. 3, as the screw 52 is turned into the bar 43, clamping bar 44 is forced against one side of the slot 51 and one side of the groove 50 in the mounting block and clamping bar 43 is moved toward clamping bar 44 by the screw so that the element becomes wedged between the two bars. It should be noted that the slot 51 and the groove 50 have been designed to be wider than necessary in order to permit easier insertion of the element into the clamp prior to the tightening of the screw 52.

Upon excitation, the piezoelectric element will cause some vibrations in the various members of the clamping assembly. Although these vibrations are not sufficient to cause the screw 52 to back off from the surface 43 of the element, lock washer 53 has been provided to guard against the possibility of this occurrence.

The assembly serves not only to mount the element, but also to provide electrical terminals for connecting the element to the signal source.

As has already been mentioned, the surfaces of each of the strips are coated with a conductive material so that when the element is clamped, the bars, which are in contact with these surfaces, serve as conducting means between these surfaces and the leads 60 and 61 connected to the signal source.

After the element has been clamped, the terminal clip 55 is attached to the center electrode 37 in order to provide electrical access to the electrode.

The element may be connected to a signal source by either a series connection or a parellel connection. The choice of connection depends on the particular application.

The parallel connection is more desirable for applications involving telephone ringers because the greatest displacement is obtainable when a parallel connection is used.

To provide parallel connection, the outer conducting surfaces of strips 33 and 34 are connected together by means of leads 60 and 61 on terminals 47 and 49. Leads 60 and 62 are then connected between terminals of the signal source.

The free end of the element carries clapper 28. Although the gongs could be excited if struck by the free end of the element without the use of a clapper, the tone quality of the ringer is better when a metallic clapper is used. The clapper is positioned at a particular point near the free end of the element and is maintained at this point by means of set screw 29.

The element may be mechanically tuned to its resonant frequency by adjusting the position of the clapper. The resonant frequency of the element depends on both the material and the dimensions of the element. For elements of the type described above, it has been possible to obtain resonant frequencies in the range of 16 c.p.s.–200 c.p.s.

Upon energization, the element vibrates in flexural mode, with the frequency of vibration being determined by the frequency of the signal that is applied. Because the element that is used is composed of two ceramic strips more deflection is obtained than when a homogeneous type element, such as the one shown in the Bernstein et al. patent mentioned above, is used, and consequently, the sound output level obtained when the clapper strikes the gongs will be higher.

Although this invention has been explained with reference to a preferred embodiment, there are a number of other embodiments that would provide equally good operation.

For instance, if certain mounting modifications are made, the piezoelectric element that has been shown could be replaced by one that is capable of vibrating in either torsional or twisting modes, or the element could consist of a single strip, rather than a pair of strips, and have the center electrode replaced by a number of conductive impurity regions to permit polarization of the element.

FIGS. 4, 5 and 6 show other embodiments of the invention, each of which employ piezo-spring elements. Each element is in the form of a coil-shaped ceramic strip and is preferably made of a homogeneous material. The electrodes, which are bonded to the sides of the spring element, are the same as described in the previous embodiment. The element is clamped at one end and is polarized in such a way that, upon energization, the free end of the element will move back and forth along a straight line that can be drawn between the point at which the element is clamped and the free end of the element. A clapper, which is carried by the free end of the element, will be moved to strike the gongs whenever the element is energized.

An arrangement for a ringer is shown in FIG. 4, wherein the element is mounted within the gong. This embodiment shows a gong 70 mounted to a base 71 by means of a screw 72 and piezo-spring elements 73 and 74 mounted to the base within the gong by means of a clamping assembly 75. Each of the piezo-spring elements is clamped at one end and carries a clapper 76, 77 on a free end.

FIGS. 5 and 6 show alternative arrangements employing piezo-spring elements. The element 80 is mounted on a base 81 which also carries a gong 82.

The assemblies shown in FIG. 4 and FIG. 6 may include a single piezo-spring element which is clamped at or near the middle and which carries a clapper on either end. An assembly of this type would require simpler clamping arrangements than would be required for two separate elements.

In each of the elements in FIGS. 4 and 6, the number of loops required for each element would be determined by the amount of the deflection that is needed and to some extent would be a function of the material that is used and the dimensions of the material.

The embodiment shown in FIGS. 1–3 has not been claimed in this application, but has been made the subject matter of claims in my copending U.S. application Ser. No. 561,537, filed June 29, 1966.

What is claimed is:

1. A telephone ringer operable upon application of an A.C. voltage, said ringer comprising: a base; gong means mounted on said base to produce acoustical energy when struck; a coil-shaped piezoelectric element having two ends and having electrodes to which said A.C. voltage is applied; and means mounted on said base for clamping said element at one point so that at least one of said ends positioned adjacent said gong means is free to move, said element extending along a line interconnecting said one point and said free end and being responsive to the application of said A.C. voltage to cause said free end to move back and forth in a direction along said line whereby said free end strikes said gong means.

2. The telephone ringer as claimed in claim 1, wherein said piezoelectric element is mounted within said gong means.

References Cited

UNITED STATES PATENTS

| | | | |
|---|---|---|---|
| 3,027,554 | 3/1962 | Cassell | 340—396 X |
| 3,127,602 | 3/1964 | Russo et al. | 340—392 |
| 3,218,636 | 11/1965 | Bernstein et al. | 340—392 |
| 3,225,226 | 12/1965 | Kawakami | 310—8.3 X |

JOHN W. CALDWELL, *Primary Examiner.*

C. M. MARMELSTEIN, *Assistant Examiner.*

U.S. Cl. X.R.

310—8.2, 8.6, 8.7; 340—396